(12) United States Patent
Ghannam et al.

(10) Patent No.: US 9,688,111 B1
(45) Date of Patent: Jun. 27, 2017

(54) TRAILER SAFETY CHAIN ATTACHMENT MONITORING SYSTEM

(71) Applicant: FORD GLOBAL TECHNOLOGIES, LLC, Dearborn, MI (US)

(72) Inventors: Mahmoud Yousef Ghannam, Canton, MI (US); David James Tippy, Ann Arbor, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 14/966,634

(22) Filed: Dec. 11, 2015

(51) Int. Cl.
*G08B 21/00* (2006.01)
*B60D 1/24* (2006.01)
*B60D 1/07* (2006.01)
*B60D 1/58* (2006.01)

(52) U.S. Cl.
CPC ............... *B60D 1/24* (2013.01); *B60D 1/07* (2013.01); *B60D 1/58* (2013.01)

(58) Field of Classification Search
CPC .............. B60D 1/06; B60D 1/24; B60D 1/18
USPC ...... 340/431, 438, 457, 815.4; 280/504, 511
See application file for complete search history.

(56) References Cited

U.S. PATENT DOCUMENTS

| | | | | |
|---|---|---|---|---|
| RE28,590 E | * | 10/1975 | Salmi ...................... | B60D 1/38 280/477 |
| 4,271,401 A | * | 6/1981 | Meo ........................ | B60D 1/28 200/51.1 |
| 5,362,084 A | * | 11/1994 | Edwards .................. | B60D 1/28 280/432 |
| 6,466,028 B1 | | 10/2002 | Coppinger et al. | |
| 7,926,832 B1 | | 4/2011 | Hall | |
| 2011/0115196 A1 | * | 5/2011 | Wulff ...................... | B60D 1/00 280/477 |
| 2013/0334793 A1 | * | 12/2013 | Laprade .................. | B60D 1/06 280/511 |

* cited by examiner

*Primary Examiner* — Phung Nguyen
(74) *Attorney, Agent, or Firm* — Frank A. MacKenzie; Brooks Kushman P.C.

(57) ABSTRACT

A trailer hitch system for a vehicle includes a hitch assembly and a controller. The hitch assembly includes a receiver configured to attach with first and second chains of a trailer. The first and second chains each have a sensor being configured to transmit data indicative of a position of the corresponding chain. The controller is configured to, in response to the data indicating a crossed position of the chains, display via an interface a crossed status of the chains.

19 Claims, 2 Drawing Sheets

TRAILER SAFETY CHAIN ATTACHMENT MONITORING SYSTEM

TECHNICAL FIELD

The present disclosure relates to trailer safety systems.

BACKGROUND

Trailers can be attached to towing vehicles using trailer hitch systems. Trailer hitch systems consist of a tongue attached to the trailer and a receiver and ball attached to a frame of the vehicle. The tongue includes safety chains that connect to the receiver to aid in maintaining attachment between the tongue and the receiver. In the event of a slip of the tongue on the ball, the safety chains maintain a connection between the trailer and the towing vehicle. To be effective, trailer safety chains need to be crossed and attached to the receiver underneath the tongue and receiver on the trailer hitch system.

SUMMARY

A trailer hitch system for a vehicle includes a hitch assembly and a controller. The hitch assembly includes a receiver configured to attach with first and second chains of a trailer. The first and second chains each have a sensor being configured to transmit data indicative of a position of the corresponding chain. The controller is configured to, in response to the data indicating a crossed position of the chains, display via an interface a crossed status of the chains.

A vehicle includes a frame and a controller. The frame has a receiver configured to connect to a pair of trailer safety chains. The pair of trailer safety chains each includes a sensor configured to transmit data indicative of a position of the chain relative to the other of the chains. The controller is configured to display via an interface a connection status of the chains based on the data.

A control method for a trailer hitch safety system includes the steps of, in response to trailer safety chain sensor data being indicative of a crossed trailer safety chain arrangement, display via an interface indicia representing a proper chain connection, and in response to trailer safety chain sensor data being indicative of an uncrossed trailer safety chain arrangement, display via an interface indicia representing an improper chain connection.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
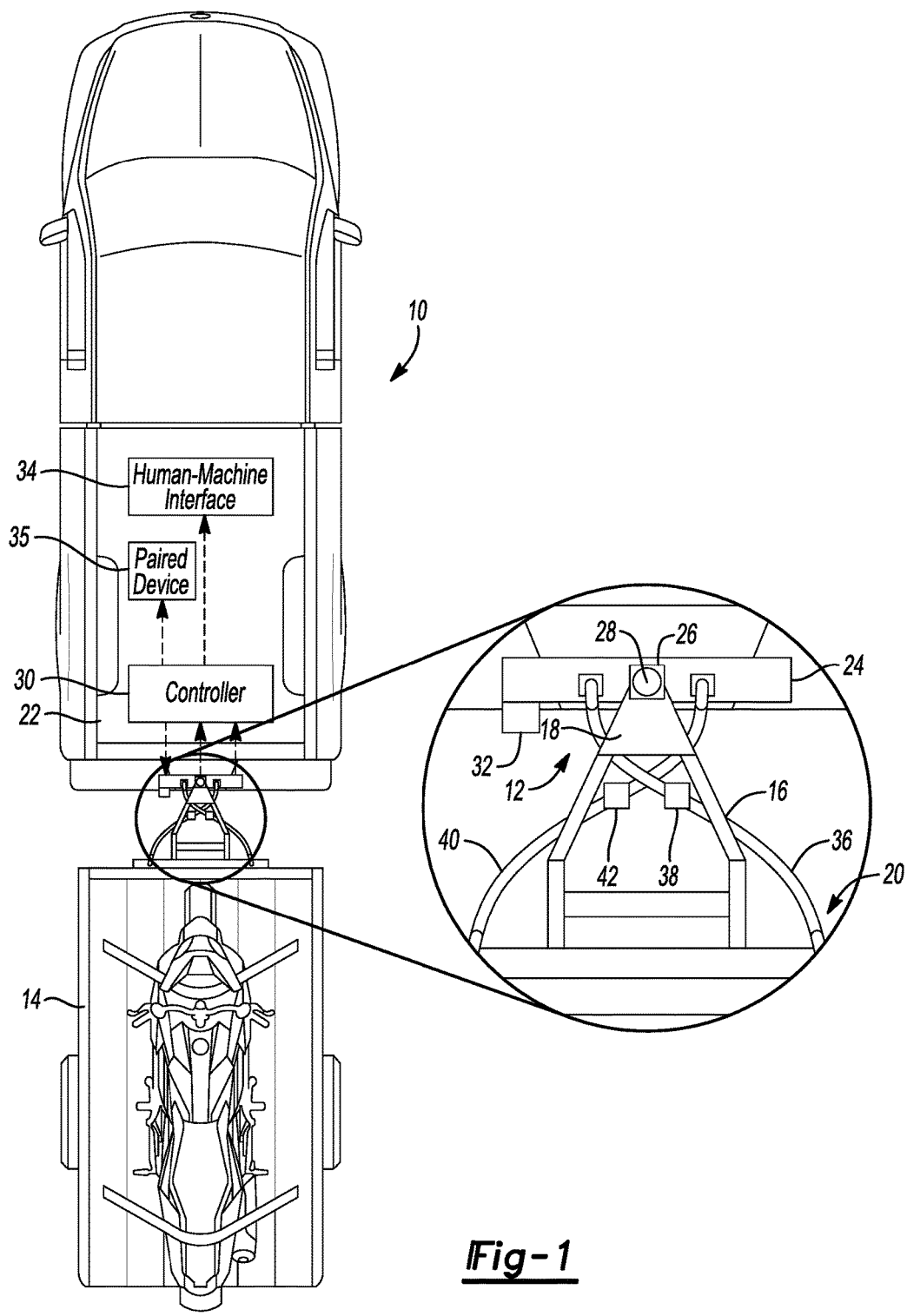
FIG. 1 is a top schematic view of a vehicle having a trailer safety system.

FIG. 1 depicts a top schematic view of a vehicle 10 having a trailer hitch safety system 12. The trailer safety system 12 includes a trailer 14 with a trailer hitch 16, a tongue 18, and safety chains 20, as well as a vehicle frame 22 connected with a receiver 24, drawbar 26, and ball 28. The trailer safety system 12 further includes a controller 30, and an external light 32 attached with the receiver 24, and an interface 34. The safety chains 20 include a first safety chain 36 having a first sensor 38 and a second safety chain 40 having a second sensor 42. The first safety chain 36 crosses the second safety chain 40 and attaches to the receiver 24 underneath the trailer hitch 16 and the tongue 18.

The safety chains 20 crisscross underneath the trailer hitch 16 and the tongue 18 in the event of a failure between the trailer hitch 16 and the receiver 24. For example, if the tongue 18 does not sufficiently latch onto the drawbar 26 and ball 28, the trailer hitch 16 may separate from the receiver 24. When the trailer hitch 16 separates from the receiver 24, the trailer 14 becomes disconnected from the vehicle 10. The safety chains 20 not only provide an additional connection between the trailer 14 and the vehicle 10, but may also provide a support for the tongue 18 to prevent the tongue 18 from contacting a road (not shown). Therefore, if the safety chains 20 are not properly connected to the receiver 24, a failure between the tongue 18 and the ball 28 may result in complete separation between the trailer 14 and the vehicle 10.

The trailer safety system 12 provides for detection and monitoring of the position of the safety chains 20 using the external light 32, the first sensor 38 and the second sensor 42, and the interface 34. The trailer safety system 12 provides an early indication if the placement of the safety chains 20 is improper. As will be discussed in more detail below, the trailer safety system 12 communicates with the controller 30 to alert the controller 30 if the safety chains 20 are not connected, properly connected, or become disconnected or improperly connected during vehicle travel. This allows the controller 30 to activate various vehicle systems to ensure that an occupant is aware of the position of the safety chains 20. Increasing awareness of the position of the safety chains 20 allows the occupant an opportunity to remedy an improper use of the safety chains 20 and provide further safety when the vehicle 10 is towing a trailer 14.

As stated above, the safety chains 20 include a first chain 36 having a first sensor 38 and a second chain 40 having a second sensor 42. The first sensor 38 and the second sensor 42 may be contact sensors. The first sensor 38 and the second sensor 42 may be configured such that contact between the first chain 36 and the second chain 40 allows the first sensor 38 and the second sensor 42 to monitor a position of the safety chains 20. For example, if the first chain 36 and the second chain 40 are crisscrossed, contact between the first sensor 38 and the second sensor 42 may indicate proper placement of the safety chains 20 to the controller 30. Likewise, if the first chain 36 and the second chain 40 are not properly crossed or are not in contact, the first sensor 38 and the second sensor 42 may indicate improper contact or no contact, respectively. The first sensor 38 and the second sensor 42 may use a variety of communication methods to indicate the position of the safety chains 20 to the controller 30.

The first sensor 38 and the second sensor 42 may be any sensor configured to determine a position of the first chain 36 relative to the second chain 40. In at least one embodiment, tactile sensors may be wrapped around the safety chains 20 to provide an indication of the position of the safety chains 20 to the controller 30. In at least one other embodiment, the first sensor 38 and the second sensor 42 may include, but are not limited to, magnetic field sensors, Hall Effect transducers, near field communication modules, or radio frequency identification chips. As stated above, the first sensor 38 and the second sensor 42 may be used to monitor the position of the first chain 36 relative to the second chain 40 and the attachment between the safety chains 20 and the receiver 24. The first sensor 38 and the second sensor 42 allow the controller 30 to provide an alert regarding the placement of the safety chains 20.

Communication between the first sensor 38 and the second sensor 42 may be identified using the external light 32. The controller 30 illuminates the external light 32 using a frequency based on the input from the first sensor 38 and the second sensor 42 to allow for identification of the placement of the safety chains 20. For example, if the first chain 36 is properly crisscrossed underneath the second chain 40, the first sensor 38 and the second sensor 42 may communicate the proper placement to the controller 30, which will illuminate the external light 32 at a first frequency. The first frequency may be representative of a constant frequency. Likewise, if the first chain 36 is improperly attached to the receiver 24 relative to the second chain 40, the first sensor 38 and the second sensor 42 may communicate the improper placement to the controller 30, which will illuminate the external light 32 at a second frequency. The second frequency may be representative of an intermittent frequency. The controller 30 may also be configured to illuminate the external light 32 using a third frequency if the first sensor 38 and the second sensor 42 indicate that the safety chains 20 are not connected to the receiver 24. The frequencies may be preset and other frequencies may be used to distinguish between proper placement, improper placement, and no connection of the safety chains 20.

The controller 30 may also be configured to illuminate the external light 32 using a variety of colors to distinguish between a proper connection, an improper connection, or no connection of the safety chains 20. For example, if the first sensor 38 and the second sensor 42 indicate proper placement of the safety chains 20, then the controller 30 may illuminate the external light 32 to project a substantially greenish color. If the first sensor 38 and the second sensor 42 indicate improper placement of the safety chains 20, then the controller 30 may illuminate the external light 32 to project a substantially yellowish color. And finally, if the first sensor 38 and second sensor 42 indicate that the safety chains 20 are not connected to the receiver 24, then the controller 30 may illuminate the external light to project a substantially reddish color. The colors described are merely an example and other colors may be used to indicate and distinguish between proper placement, improper placement, and no connection of the safety chains 20.

Using the external light 32 to indicate the position of the safety chains 20 allows for an instantaneous and initial feedback of the safety chain placement. The occupant may be able to determine, via the external light 32, if the safety chains 20 are properly attached to the receiver 24. This allows an occupant the ability to correct a possible improper placement, or remind the occupant to attach the safety chains 20 to the receiver 24. While described as a visual indication using an external light 32, an audible indication may also be contemplated. For example, a speaker (not shown) may be used in place of the external light 32 to indicate, using a variety of tones or dialects, whether the safety chains 20 are properly connected, improperly connected, or not connected to the receiver 24. This allows the trailer safety system 12 to provide an advanced indication of safely connected safety chains 20 before the vehicle 10 is operated on the road.

As stated above, the controller 30 may continuously monitor the position of the safety chains 20 as the vehicle 10 travels on the road. During operation of the vehicle 10, the controller 30 may be configured to continuously receive signals from the first sensor 38 and the second sensor 42 to monitor the position of safety chains 20. For example, the first chain 36 may change a position relative to the second chain 40 and cause the safety chains 20 to be disconnected. The controller 30 may be configured to display a connection status of the safety chains 20 based on the input from the first sensor 38 and the second sensor 42 to the interface 34. The interface 34 provides an indication whether the safety chains 20 have maintained a proper or crossed connection, an improper or uncrossed connection, or no connection during vehicle travel. The controller 30 may be configured to display the indication on the interface 34 by illuminating a light, displaying a symbol, or announcing an audible tone or dialect. In at least one embodiment, the indication may include different lights, symbols, or tones relative to a crossed status, an uncrossed status, or an unconnected status. This allows the trailer safety system 12 to provide real-time monitoring and indication of the position of the safety chains 20. The controller 30 may also be configured to display the connection status of the safety chains 20 to a device 35 paired with the interface 34 using an in-vehicle network, Wifi, or Bluetooth connection.

Figure 2:
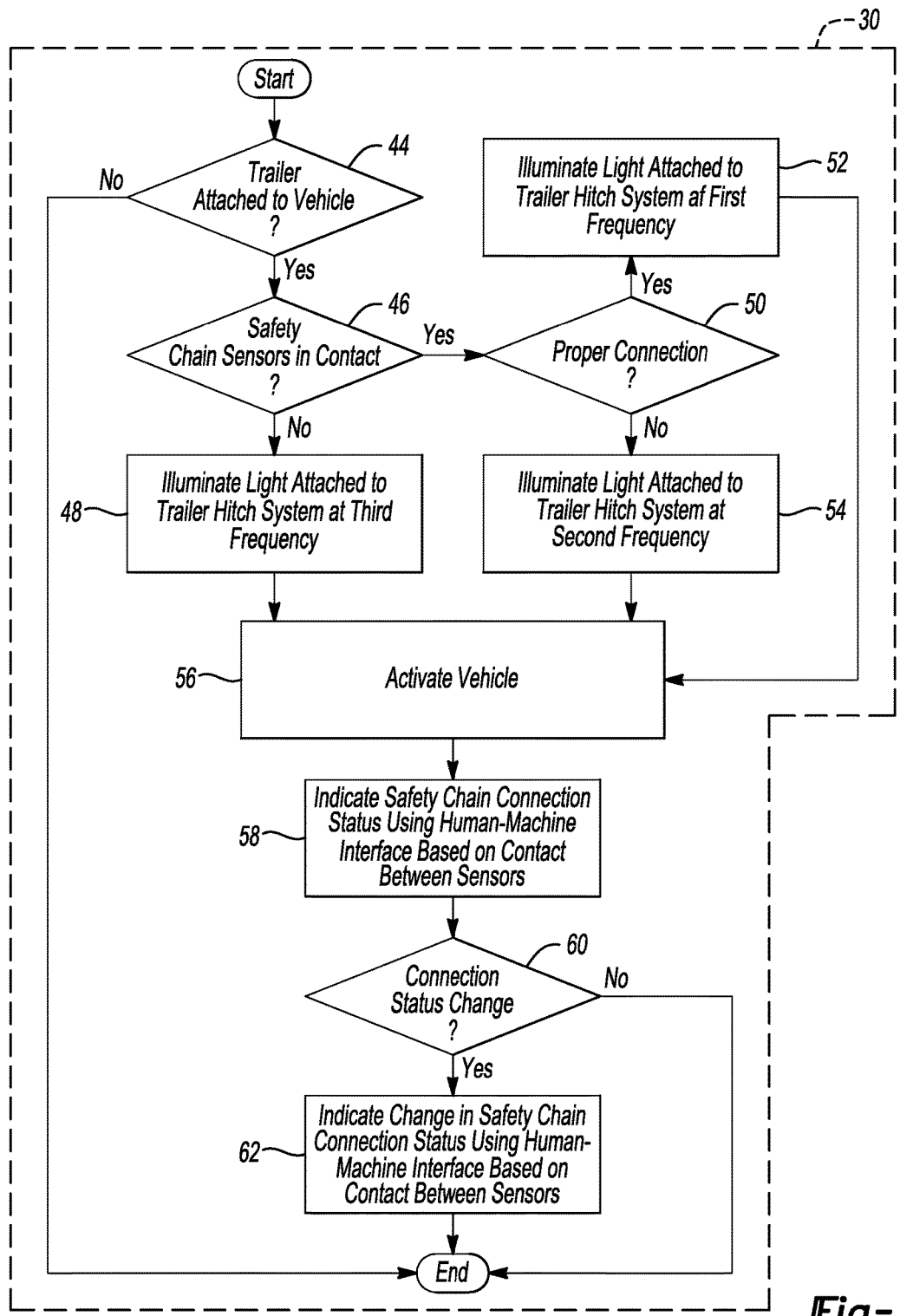
FIG. 2 is a control logic flow diagram for the trailer safety system.

FIG. 2 depicts control logic for the trailer safety system 12 used by the controller 30. The trailer safety system 12 uses control logic to operate as described above. However, the trailer safety system 12 may also segment the control logic. For example, the trailer safety system 12 may also be configured to only illuminate the external light as described above, or display the real-time position of the safety chains as described above. Likewise, the control logic for the trailer safety system 12 is described as sequential, however may be operated simultaneously. Operation of the trailer safety system 12 may be accomplished using the steps described below in any manner or fashion that allows the trailer safety system 12 to operate as discussed.

At 44, the trailer safety system 12 may determine if the trailer is attached to the vehicle. Determining if the trailer is attached to the vehicle at 44 may be done using a pre-existing trailer monitoring system. If at 44 the trailer safety system 12 determines that no trailer is attached to the vehicle, the control logic ends. If at 44, the trailer safety system 12 determines a trailer is attached to a vehicle, then the trailer safety system 12 determines if the safety chains are in contact at 46. The trailer safety system 12 determines if the safety chains are in contact at 46 using the sensors described above. If the trailer safety system 12 determines at 46 that the safety chains are not in contact based on input from the sensors, the trailer safety system 12 instructs the controller to illuminate the external light at a third frequency at 48. Illuminating external light at a third frequency at 48 may provide an immediate indication that the safety chains are not attached.

If at 46 the trailer safety system 12 determines that the safety chains are in contact, the trailer safety system 12 may then determine the connection status of the safety chains at 50. At 50, the trailer safety system 12 determines, based on input from the sensors, if the safety chains are properly connected. If at 50, the trailer safety system 12 determines that the safety chains are properly connected, the trailer safety system 12 instructs the controller to illuminate the external light at a first frequency at 52 indicative of a proper connection of the safety chains. Illumination of the external light at the first frequency at 52 provides an immediate indication that the safety chains are properly connected and ready for road use. If at 50, the trailer safety system 12 determines that the safety chains are not properly connected, the trailer safety system 12 instructs the controller to illuminate the external light at a second frequency at 54. Illumination of the external light at the second frequency at 54 provides an immediate indication that the safety chains are not properly connected.

The trailer safety system 12 may also be configured to receive input of vehicle activation at 56. Vehicle activation at 56 allows the trailer safety system 12 to determine if the vehicle is moving. The trailer safety system 12, after vehicle activation at 56, may then instruct the controller to display in indication of the safety chain connection status using the interface at 58. Displaying the safety chain connection status on the interface at 58 allows the trailer safety system 12 to provide real-time monitoring and assessment of the safety chain position within a cabin of the vehicle. The trailer safety system 12 determines at 60 if the connection status between the safety chains has changed. If at 60, the trailer safety system 12 determines that the connection status between the safety chains has not changed, the trailer safety system 12 will continue to monitor input from the sensors to assess the safety chain position and display the status of the safety chain position using the interface at 58. If at 60, the trailer safety system 12 determines that the connection status of the safety chains has changed, the trailer safety system 12 instructs the controller to indicate the change of status using the interface at 62. At 62, the trailer safety system may instruct the controller to display the change of status of the safety chain position using the interface, as described above.

The control logic for the trailer safety system 12 may be implemented on a single controller, or use multiple controllers to monitor vehicle systems, to provide the indications as described above, and adjust various components of the vehicle to account for the position of the safety chains. The control logic described above further aids the vehicle to provide additional safety measures and allows for improved response time and indication of a potential change in safety chain positions.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A trailer hitch system for a vehicle comprising:
   a hitch assembly including a receiver configured to attach with first and second chains of a trailer, each having a sensor being configured to transmit data indicative of a position of the corresponding chain; and
   a controller configured to, in response to the data indicating a crossed position of the chains, display via an interface a crossed status of the chains.

2. The trailer hitch system of claim 1, wherein the controller is further configured to, in response to the data indicating an uncrossed position of the chains, display via the interface an uncrossed status of the chains.

3. The trailer hitch system of claim 1, wherein the controller is further configured to, in response to the data indicating an uncrossed position of the chains, illuminate a light attached to the receiver to identify an uncrossed status of the chains.

4. The trailer hitch system of claim 1, wherein the controller is further configured to, in response to the data indicating an unconnected position of the chains, illuminate a light attached to the receiver to identify an unconnected status of the chains.

5. The trailer hitch system of claim 1, wherein the controller is further configured to, in response to the data indicating the crossed position of the chains, illuminate a light attached to the receiver to identify the crossed status of the chains.

6. The trailer hitch system of claim 1, wherein the controller is further configured to continually monitor the data during operation of the vehicle.

7. A vehicle comprising:
   a frame having a receiver configured to connect to a pair of trailer safety chains each including a sensor configured to transmit data indicative of a position of the chain relative to the other of the chains; and
   a controller configured to display via an interface a connection status of the chains based on the data.

8. The vehicle of claim 7, wherein the controller is further configured to, in response to the data indicating a change in the relative position of the chains, alter the interface to indicate a corresponding change in the connection status.

9. The vehicle of claim 7, wherein contact between the sensors indicates the connection status of the chains.

10. The vehicle of claim 7 further comprising a light attached to the receiver and connected to the sensors such that contact between the sensors results in illumination of the light.

11. The vehicle of claim 10, wherein the controller is further configured to blink the light at a first frequency to indicate a proper connection between the chains.

12. The vehicle of claim 11, wherein the controller is further configured to blink the light at a second frequency to indicate an improper connection between the chains.

13. A control method for a trailer hitch safety system comprising:

in response to trailer safety chain sensor data being indicative of a crossed trailer safety chain arrangement, display via an interface indicia representing a proper chain connection; and in response to trailer safety chain sensor data being indicative of an uncrossed trailer safety chain arrangement, display via an interface indicia representing an improper chain connection.

14. The control method of claim 13 further comprising, in response to the trailer safety chain sensor data being indicative of the crossed trailer safety chain arrangement, transmit to a device paired with the interface over a network the indicia representing the proper chain connection.

15. The control method of claim 13 further comprising, in response to the trailer safety chain sensor data being indicative of the uncrossed trailer safety chain arrangement, transmit to a device paired with the interface over a network the indicia representing the improper chain connection.

16. The control method of claim 13 further comprising, in response to the trailer safety chain sensor data being indicative of the crossed trailer safety chain arrangement, blink a light attached to a trailer hitch assembly at a first frequency.

17. The control method of claim 16 further comprising, in response to the trailer safety chain sensor data being indicative of the uncrossed trailer safety chain arrangement, blink the light at a second frequency.

18. The control method of claim 17 further comprising, in response to trailer safety chain sensor data being indicative of an unconnected trailer safety chain arrangement, blink the light at a third frequency.

19. The control method of claim 13 further comprising, in response to the trailer safety chain sensor data being indicative of a change in a trailer safety chain arrangement, alter the indicia to represent a change in the trailer safety chain connection.

* * * * *